(12) United States Patent
Nah et al.

(10) Patent No.: US 11,216,989 B2
(45) Date of Patent: Jan. 4, 2022

(54) MOBILE DEVICE AND METHOD FOR CONTROLLING SAME

(71) Applicant: LG ELECTRONICS INC., Seoul (KR)

(72) Inventors: Jaeho Nah, Seoul (KR); Yeongkyu Lim, Seoul (KR); Byeongjun Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/057,025

(22) PCT Filed: Aug. 20, 2018

(86) PCT No.: PCT/KR2018/009513
§ 371 (c)(1),
(2) Date: Nov. 19, 2020

(87) PCT Pub. No.: WO2020/036244
PCT Pub. Date: Feb. 20, 2020

(65) Prior Publication Data
US 2021/0209814 A1      Jul. 8, 2021

(30) Foreign Application Priority Data
Aug. 13, 2018    (KR) .................. 10-2018-0094598

(51) Int. Cl.
*G06T 11/00*        (2006.01)
*G06K 9/62*         (2006.01)
(Continued)

(52) U.S. Cl.
CPC ............ *G06T 11/001* (2013.01); *G06K 9/628* (2013.01); *G06T 1/60* (2013.01); *G06T 9/00* (2013.01);
(Continued)

(58) Field of Classification Search
CPC . G06T 11/001; G06T 1/60; G06T 9/00; G06T 2200/24; G06T 2210/36; G06K 9/628
(Continued)

(56) References Cited

U.S. PATENT DOCUMENTS 5,831,625 A     11/1998  Rich et al.
2011/0032251 A1*  2/2011  Pothana ................. G06T 9/00
                                                    345/419
(Continued)

FOREIGN PATENT DOCUMENTS

CN          10134461 A      1/2009
CN          101620724 A     1/2010
(Continued)

*Primary Examiner* — Hai Tao Sun
(74) *Attorney, Agent, or Firm* — Birch, Stewart, Kolasch & Birch, LLP

(57) ABSTRACT

The present invention relates to a mobile device and a method for controlling same, and the subject matter of the present invention comprises: classifying a received first texture as a static texture or a dynamic texture on the basis of the attribute of the texture; when the first texture is a static texture, classifying the first texture as a compressed texture or an uncompressed texture on the basis of compression application; when the first texture is a static texture and a compressed texture, classifying the first texture as a mipmapped texture or a non-mipmapped texture on the basis of mipmap application; when the first texture is a static texture and an uncompressed texture, classifying the first texture as a mipmapped texture or a non-mipmapped texture on the basis of mipmap application; when the first texture is a dynamic texture, classifying the first texture as a shadow map or a non-shadow map on the basis of the aspect ratio of a screen; adjusting the size of the first texture on the basis of the classified texture attributes; and displaying the first texture according to a control command from a control unit.

16 Claims, 18 Drawing Sheets

(51) Int. Cl.
*G06T 1/60* (2006.01)
*G06T 9/00* (2006.01)

(52) U.S. Cl.
CPC ...... *G06T 2200/24* (2013.01); *G06T 2210/36* (2013.01)

(58) Field of Classification Search
USPC ........................................................ 345/428
See application file for complete search history.

(56) References Cited

U.S. PATENT DOCUMENTS

| | | | |
|---|---|---|---|
| 2012/0019520 A1* | 1/2012 | Suzuki | H04N 13/271 |
| | | | 345/419 |
| 2012/0219233 A1* | 8/2012 | Uro | H04N 19/60 |
| | | | 382/239 |
| 2012/0281005 A1 | 11/2012 | Nystad et al. | |
| 2012/0281007 A1 | 11/2012 | Nystad et al. | |
| 2017/0084055 A1 | 3/2017 | Kwon et al. | |
| 2018/0286089 A1* | 10/2018 | Lee | G06T 11/60 |

FOREIGN PATENT DOCUMENTS

| | | |
|---|---|---|
| CN | 102595023 A | 7/2012 |
| EP | 0 653 726 A1 | 5/1995 |
| KR | 10-2016-0029550 A | 3/2016 |
| KR | 10-2018-0048081 A | 5/2018 |

* cited by examiner

FIG. 5

```
...
glGenTextures(1, &texture_id);
glBindTexture(GL_TEXTURE_2D, texture_id);
glTexParameteri(GL_TEXTURE_2D, GL_TEXTURE_MAG_FILTER, GL_LINEAR);
glTexParameteri(GL_TEXTURE_2D, GL_TEXTURE_MIN_FILTER, GL_LINEAR_MIPMAP_LINEAR);
glTexParameteri(GL_TEXTURE_2D, GL_TEXTURE_WRAP_S, GL_CLAMP_TO_EDGE);
glTexParameteri(GL_TEXTURE_2D, GL_TEXTURE_WRAP_T, GL_CLAMP_TO_EDGE);
glTexImage2D(GL_TEXTURE_2D, 0, GL_RGBA, texture_width, texture_height, 0, GL_RGBA, GL_UNSIGNED_BYTE, texture_data);
...
```

Color        luminance        final image (a)        (b)        (c)

FIG. 10
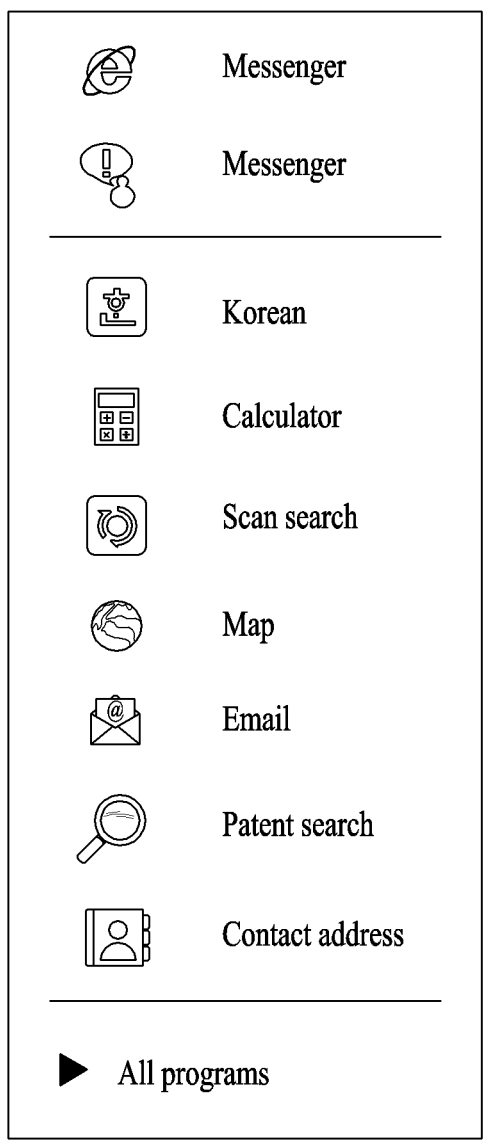
(a)
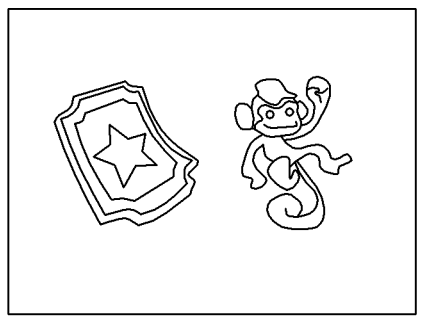
(b)

FIG. 11
Texture size is not adjusted and texture resolution is not reduced
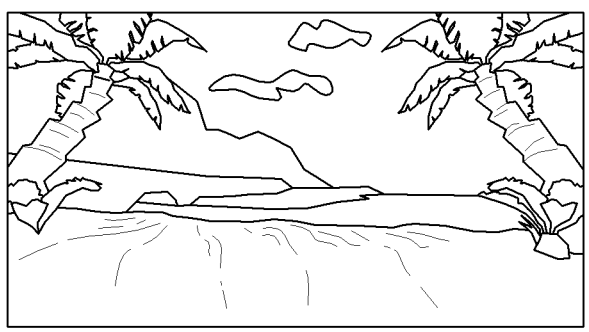
Non-shadow map
Screen aspect ratio = 1 : 1
Shadow map
Screen aspect ratio = 1 : 1

FIG. 12
Texture size is not adjusted and texture resolution is not reduced
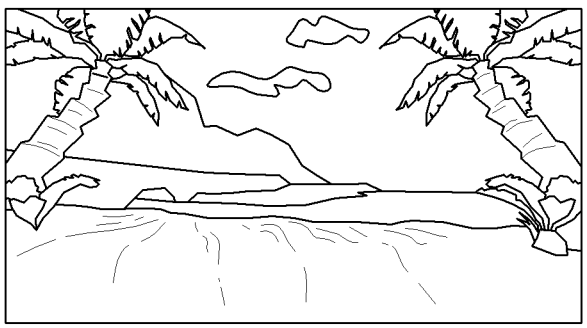
Non-shadow map
Screen aspect ratio = 1 : 1
(a)
Texture size is adjusted and texture resolution is adjusted
Shadow map
Screen aspect ratio = 1 : 1
(b)

FIG. 14
Original image
(a)
Prior art
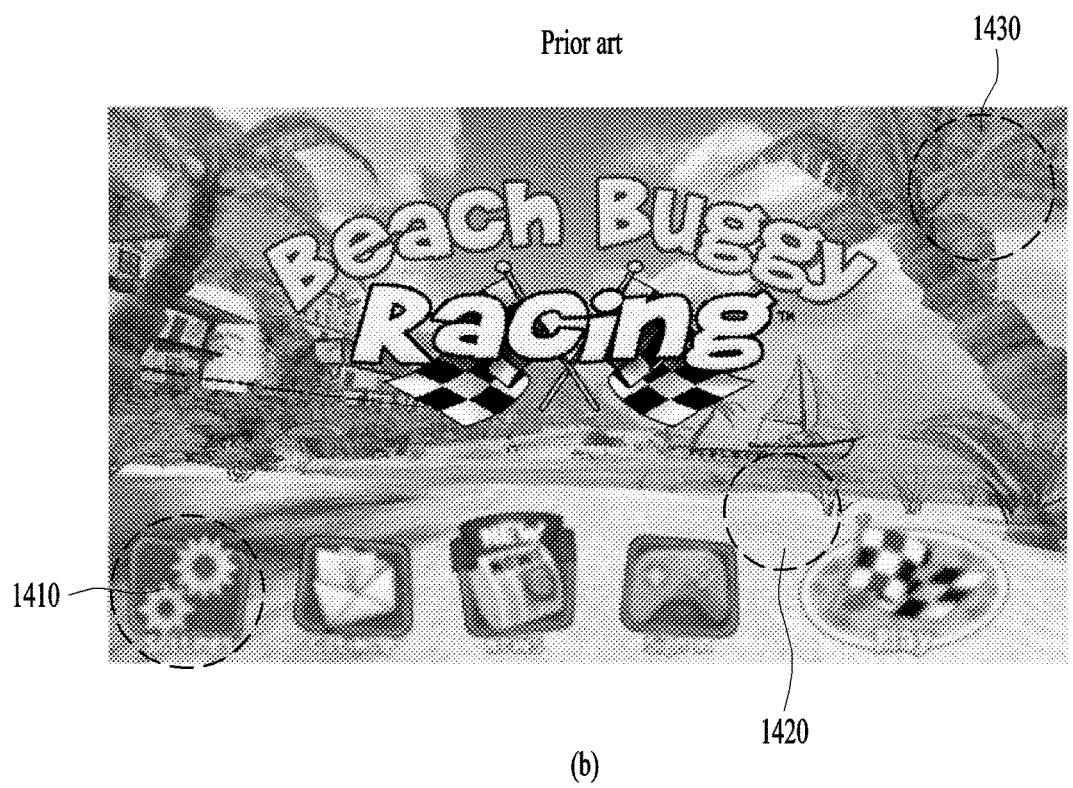
(b)

FIG. 15
Original image
(a)
Present disclosure
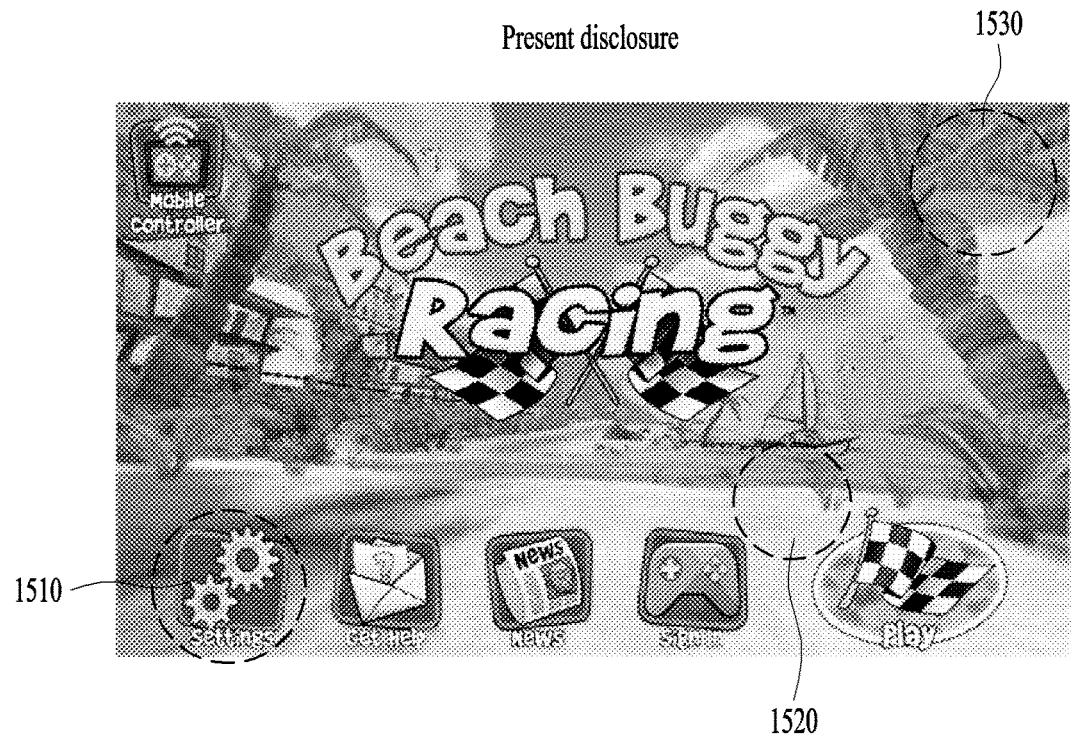
(b)

FIG. 16

Power consumption measurement results

| Games | GPU | DDR* |
|---|---|---|
| Beach Buggy Racing | 289mW → 237mW (17.9% reduction) | 1112mW → 1021mW (8.1% reduction) |
| Implosion | 467mW → 447mW (4.2% reduction) | 1460mW → 1399mW (4.1% reduction) |
| Xenowerk | 697mW → 569mW (18.3% reduction) | 969mW → 825mW (14.8% reduction) |

MOBILE DEVICE AND METHOD FOR CONTROLLING SAME

CROSS REFERENCE TO RELATED APPLICATIONS

This application is the National Phase of PCT International Application No. PCT/KR2018/009513, filed on Aug. 20, 2018, which claims priority under 35 U.S.C. 119(a) to Patent Application No. 10-2018-0094598, filed in the Republic of Korea on Aug. 13, 2018, all of these applications are hereby expressly incorporated by reference into the present application.

TECHNICAL FIELD

The present disclosure relates to a mobile device and method for controlling the same and, more particularly, to a mobile device for classifying a texture, adjusting the size of the texture based on the attributes of the texture, and displaying the texture and method for controlling the same.

BACKGROUND ART

In recent years, mobile devices have been a big issue in daily life with the development of information technology (IT). The mobile devices have become increasingly more functional. Examples of such functions include data and voice communications, capturing images and video via a camera, recording audio, playing music files via a speaker system, and displaying images and video on a display. Some mobile devices further include an electronic game play function or perform a multimedia player function. In particular, current mobile devices may receive a multicast signal that provides visual content such as broadcast, video, or television programs.

As the mobile device has become multifunctional, the mobile device has been implemented as a multimedia player with various functions, for example, capturing still images or moving images, playing music or video files, playing games, receiving broadcast, etc. In particular, when the mobile device executes a game application, real-time texture mapping is one of the most important functions.

In three-dimensional graphics modeling, a texture refers to an image that represents color, texture, etc., and texture mapping refers to a scheme of creating a detail texture on the surface of a three-dimensional virtual object and coloring thereto based on computer graphics.

In the prior art, processing is performed in the following order. First, each texture is rendered on an off-screen frame buffer. Then, a central processing unit (CPU) memory reads the results of rendering through the glReadPixels( ) function. The size of the texture is reduced on the CPU code. The reduced texture is uploaded to a graphics processing unit (GPU) memory again.

In the prior art, most uncompressed textures are one-to-one mapped to a screen rather than to an object. When the size of such a texture is adjusted, the texture becomes blurred, that is, the quality of an image is degraded. In addition, it may not be applied to a compressed texture and a dynamic texture. Further, since the processing order is as follows GPU, CPU, and GPU, a large amount of memory capacity is required and the loading time increases, thereby causing inconvenience to users.

DISCLOSURE

Technical Problem

One object of the present disclosure is to provide a mobile device and control method thereof. The mobile device may classify a texture as dynamic and static. When the texture is static, the mobile device may classify the texture as compressed or uncompressed. The mobile device may further classify the texture as mipmapped or non-mipmapped. When the texture is dynamic, the mobile device may classify the texture as a shadow or non-shadow map. The mobile device may adjust the size of the texture based on the attributes of the classified texture.

Another of the present disclosure is to provide a mobile device and control method thereof. When a texture is static, compressed, and non-mipmapped, the mobile device may adjust the size of the texture by determining the attributes of the texture as a background image.

A further object of the present disclosure is to provide a mobile device and control method thereof. When a texture is dynamic and when the screen aspect ratio of the texture is one to one, the mobile device may adjust the size of the texture by determining the attributes of the texture as a shadow map.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

In one aspect of the present disclosure, a mobile device is provided. The mobile device may include: a memory configured to store a specific application; a controller configured to: receive a first texture from the memory when the specific application is executed; classify the received first texture as static or dynamic based on texture attributes; when the first texture is static, classify the first texture as compressed or uncompressed depending on whether compression is applied; when the first texture is static and compressed, classify the first texture as mipmapped or non-mipmapped depending on whether mipmap is applied; when the first texture is static and uncompressed, classify the first texture as mipmapped or non-mipmapped depending on whether the mipmap is applied; when the first texture is dynamic, classify the first texture as a shadow map or a non-shadow map based on a screen aspect ratio; and adjust a size of the first texture based on attributes of the classified texture; and a display configured to display the first texture according to a control command from the controller.

In another aspect of the present disclosure, a method of controlling a mobile device is provided. The method may include: receiving a first texture from a memory when a specific application stored in the memory is executed; classifying the received first texture as static or dynamic based on texture attributes; when the first texture is static, classifying the first texture as compressed or uncompressed depending on whether compression is applied; when the first texture is static and compressed, classifying the first texture as mipmapped or non-mipmapped depending on whether mipmap is applied; when the first texture is static and uncompressed, classifying the first texture as mipmapped or non-mipmapped depending on whether the mipmap is applied; when the first texture is dynamic, classifying the first texture as a shadow map or a non-shadow map based on a screen aspect ratio; adjusting a size of the first texture based on attributes of the classified texture; and displaying the first texture according to a control command from a controller.

Advantageous Effects

According to an embodiment of the present disclosure, a texture is classified as dynamic or static. When the texture is static, the texture is classified as compressed or uncompressed. The texture is further classified as mipmapped or non-mipmapped. When the texture is dynamic, the texture is classified as a shadow or non-shadow map. Since the size of the texture is adjusted based on the attributes of the classified texture, the size of the texture may be properly adjusted depending on the attributes of the texture, thereby avoiding image quality degradation and improving power efficiency.

According to another embodiment of the present disclosure, when a texture is static, compressed, and non-mipmapped, the size of the texture is adjusted by determining the attributes of the texture as a background image. Thus, the size of the texture may be properly adjusted depending on the attributes of the texture, thereby avoiding image quality degradation and decreasing the loading time.

According to a further embodiment of the present disclosure, when a texture is dynamic and when the screen aspect ratio of the texture is one to one, the size of the texture is adjusted by determining the attributes of the texture as a shadow map. Thus, the overall resolution may decrease when reduction is performed in a specific case, thereby avoiding image quality degradation and decreasing loading time.

It will be appreciated by persons skilled in the art that the effects that could be achieved with the present disclosure are not limited to what has been particularly described hereinabove and other advantages of the present disclosure will be more clearly understood from the following detailed description.

DESCRIPTION OF DRAWINGS

FIG. 5 is a diagram illustrating a texture classification method based on OpenGL command syntax according to an embodiment of the present disclosure.

FIG. 10 is a diagram illustrating the adjustment of the size of the first texture when the first texture is static, uncompressed, and non-mipmapped according to an embodiment of the present disclosure.

FIG. 11 is a diagram illustrating the adjustment of the size of the first texture in the prior art when the first texture is dynamic.

FIG. 12 is diagram illustrating the adjustment of the size of the first texture according to the present disclosure when the first texture is dynamic.

FIG. 14 is a diagram illustrating an image in which the size of a texture is adjusted according to the prior art.

FIG. 15 is a diagram illustrating an image in which the size of a texture is adjusted according the present disclosure.

FIG. 16 is a table showing comparison between power consumption in the prior art and power consumption according to the present disclosure.

BEST MODE

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function.

In the present disclosure, that which is well-known to one of ordinary skill in the relevant art has generally been omitted for the sake of brevity.

The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with or to" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, Personal Digital Assistants (PDAs), Portable Multimedia Players (PMPs), navigators, slate PCs, tablet PCs, ultra books, wearable devices (for example, smart watches, smart glasses, Head Mounted Displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, digital signage and the like.

Figure 1A:
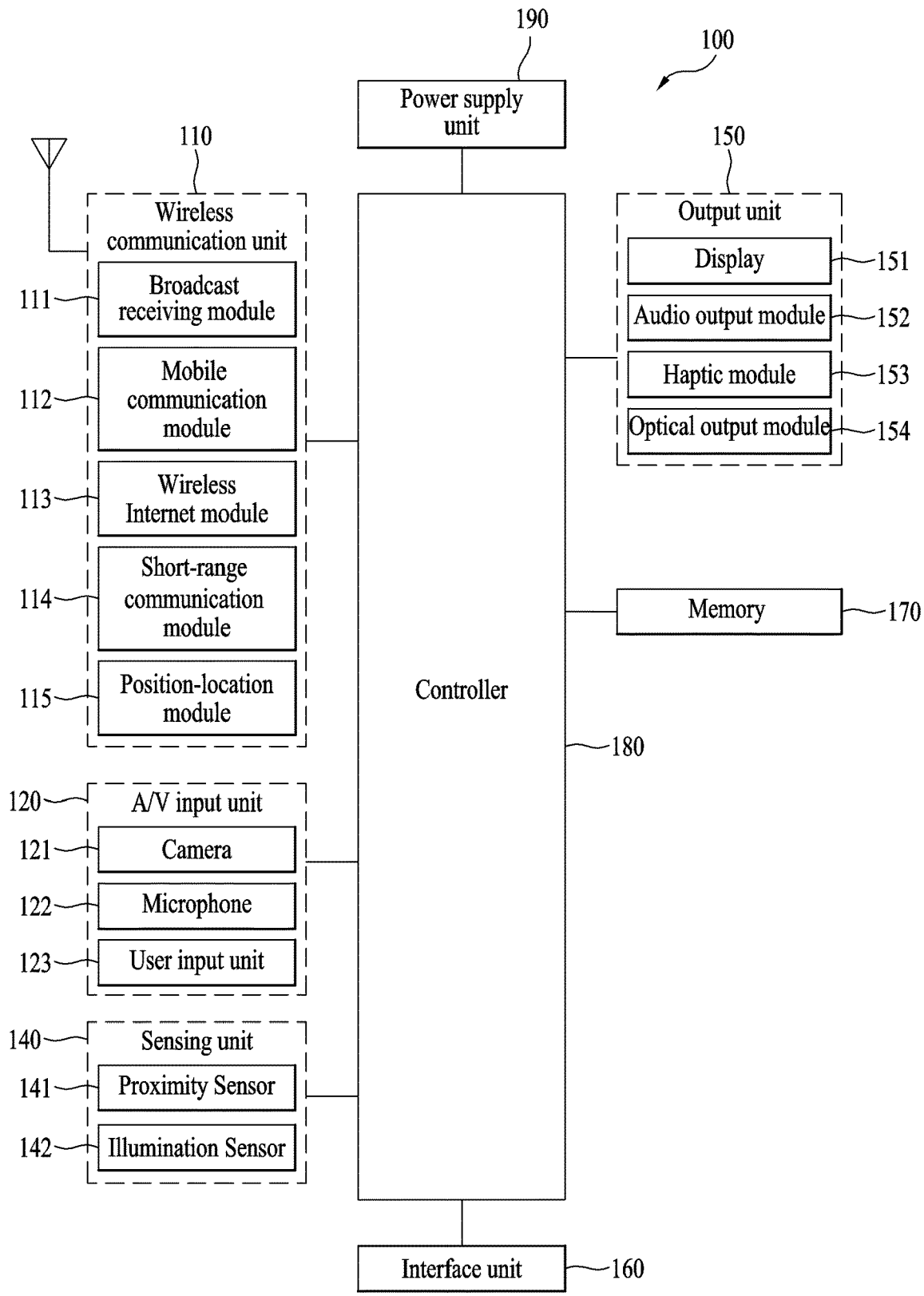
FIG. 1a is a block diagram illustrating a mobile terminal according to the present disclosure.
Figure 1B:
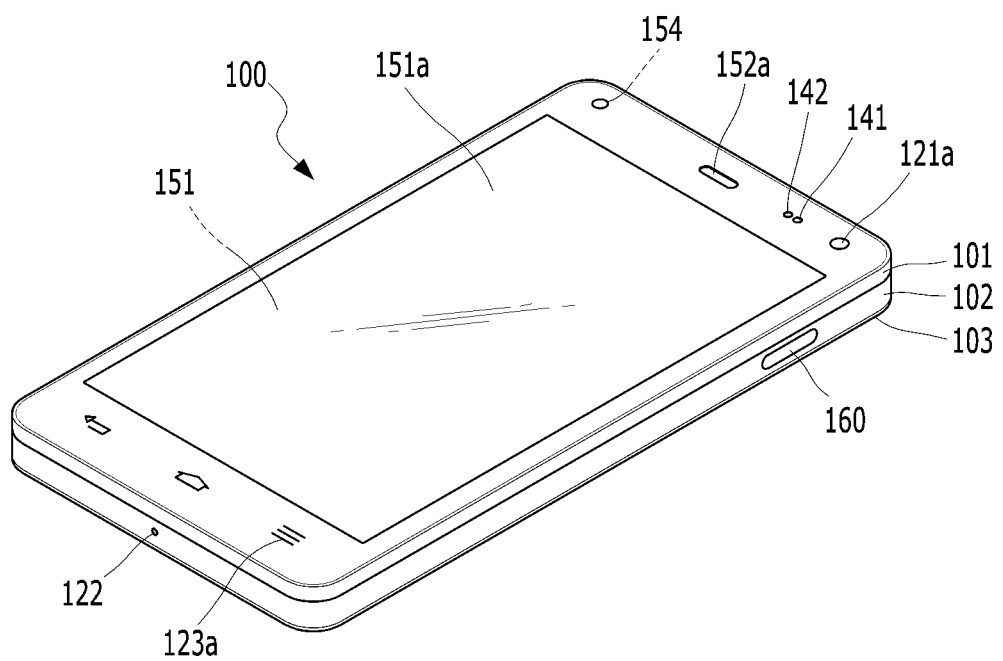
FIGS. 1b and 1c are conceptual views of the mobile terminal according to the present disclosure viewed from different directions.
Figure 1C:
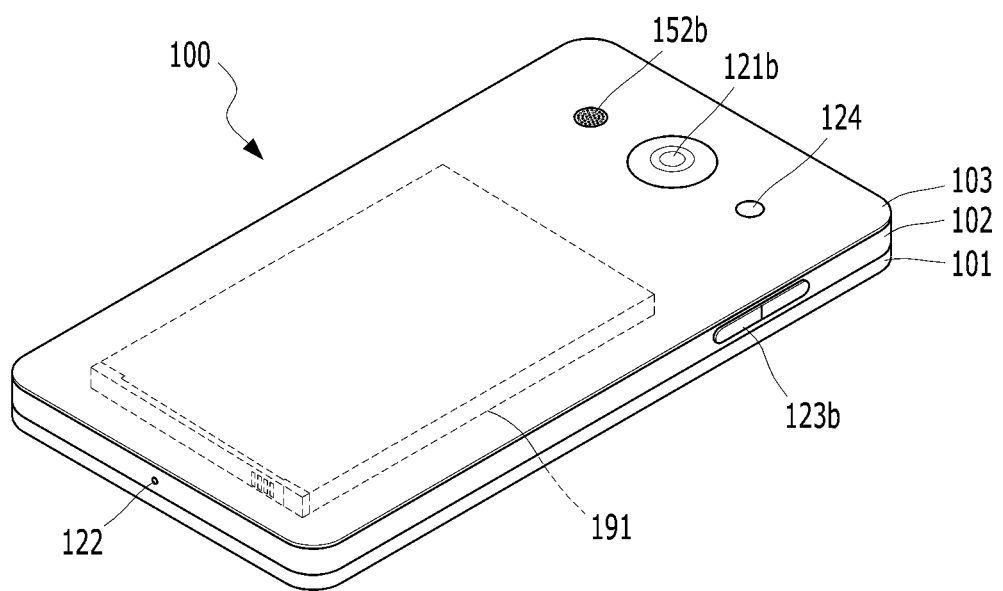

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented. Referring now to FIG. 1A, the mobile terminal 100 is shown having wireless communication unit 110 configured with several commonly implemented components.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a position location module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 processes signals, data, information and the like inputted or outputted through the above-mentioned components and/or runs application programs saved in the memory 170, thereby processing or providing a user with appropriate information and/or functions.

The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIG. 1A according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least one portion of the respective components mentioned in the foregoing description can cooperatively operate to embody operations, controls or controlling methods of the mobile terminal according to various embodiments of the present invention mentioned in the following description. Moreover, the operations, controls or controlling methods of the mobile terminal can be embodied in the mobile terminal by running at least one or more application programs saved in the memory 170.

Referring still to FIG. 1A, various components depicted in this figure will now be described in more detail.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

By generating the broadcast management server, broadcast signal and/or broadcast related information. It may refer to a server for transmitting lines or a server for receiving pre-generated broadcast signals and/or broadcast-related information and transmitting them to a terminal. The broadcast signal may include not only a TV broadcast signal, a radio broadcast signal, and a data broadcast signal, but also a broadcast signal in the form of a TV broadcast signal or a radio broadcast signal and a data broadcast signal combined.

The broadcast signal may be encoded according to at least one of technical standards (or a broadcast method, for example, ISO, IEC, DVB, ATSC, etc.) for transmission and reception of digital broadcast signals, and the broadcast repair module 111 includes technical standards. Digital broadcast signals can be received using a method suitable for the technical standard determined in.

Broadcast-related information may mean information related to a broadcast channel, a broadcast program, or a broadcast service provider. Broadcast-related information may also be provided through a mobile communication network. In this case, it may be received by the mobile communication module 112.

Broadcast-related information may exist in various forms, such as an Electronic Program Guide (EPG) of Digital Multimedia Broadcasting (DMB) or an Electronic Service Guide (ESG) of Digital Video Broadcast-Handheld (DVB-H). Broadcast signals and/or broadcast-related information received through the broadcast reception module 111 may be stored in the memory 160.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The position-location module 115 is generally configured to detect, calculate, derive or otherwise identify a position of the mobile terminal. As an example, the position-location module 115 includes a Global Position System (GPS) module, a Wi-Fi module, or both. If desired, the position-location module 115 may alternatively or additionally function with any of the other modules of the wireless communication unit 110 to obtain data related to the position of the mobile terminal. As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 100. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others. As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

In general, a 3D stereoscopic image is composed of a left image (image for the left eye) and a right image (image for the right eye). According to the method in which the left and right images are combined into a 3D frond image, a top-down method in which left and right images are arranged up and down in one frame, left and right images left and right within one frame L-to-R (left-to-right, side by side) method, a checker board method in which pieces of the left and right images are arranged in a tabular form, and the left and right images are arranged in columns. Or, it is divided into an interlaced method in which the image is alternately arranged in row units, and a time sequential method in which the left image and the right image are alternately displayed by time.

In addition, the 3D thumbnail image may be generated as a single image by generating a left image thumbnail and a right image thumbnail, respectively, from the left image and the right image of the original image frame, and these are combined. In general, the thumbnail refers to a reduced image or a reduced still image. The left image thumbnail and the right image thumbnail generated in this way are displayed with a difference of left and right distance on the screen as much as a depth corresponding to the parallax between the left image and the right image, thereby representing a three-dimensional sense of space.

The left image and the right image required for realization of the 3D stereoscopic image may be displayed on the stereoscopic display unit by the stereoscopic processing unit. The 3D processing unit receives a 3D image (an image of a reference point of view and an image of an extended view) and sets a left image and a right image therefrom, or receives a 2D image and converts it into a left image and a right image.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors.

The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 can receive external power or provide internal power and supply the appropriate power required for operating respective elements and components included in the mobile terminal 100. The power supply unit 190 may include a battery, which is typically rechargeable or be detachably coupled to the terminal body for charging.

Also, the power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Also, various embodiments can be implemented in the computer and similar recording materials using software, hardware and the combination of software and hardware.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal.

In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may be provided with the display unit 151, the 1st audio output unit 152a, the 2nd audio output unit 152b, the proximity sensor 141, the illumination sensor 142, the light output unit 154, the 1st camera 121a, the 2nd camera 121b, the 1st manipulating unit 123a, the 2nd manipulating unit 123b, the microphone 122, the interface unit 160, and the like.

FIGS. 1B and 1C depict certain components as arranged on the mobile terminal. On the front of the terminal body, the display unit 1 51, the first sound output unit 152a, the proximity sensor 1 41, the illuminance sensor 142, the light output unit 154, the first camera 1 21a and the first 1 The operation unit (1 23a) is disposed, the second operation unit (123b), the microphone 122 and the interface unit 160 are disposed on the side of the terminal body, and a second sound output unit 152b is disposed on the rear side of the terminal body) And the second camera 1 21b will be described as an example.

However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices.

Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

In the figure, the first operation unit 123a is a touch key, the invention is not limited thereto. For example, the first operation unit 123a a mechanical key, or a combination of a touch key and a touch key.

The contents input by the first and second operation units 123a and 123b are variously set can be. For example, the first operation unit 123a may issue a command such as a menu, a home key, a cancel, and the second operation unit 123b receives the first sound output from the first or second sound output unit 152a or 152b the size of the sound to be output, and the switch to the touch recognition mode of the display unit 151 can be input.

The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Meanwhile, in the present invention, it can be displayed using a flexible display. In the following, this will be discussed in more detail with attached drawings.

Figure 2:
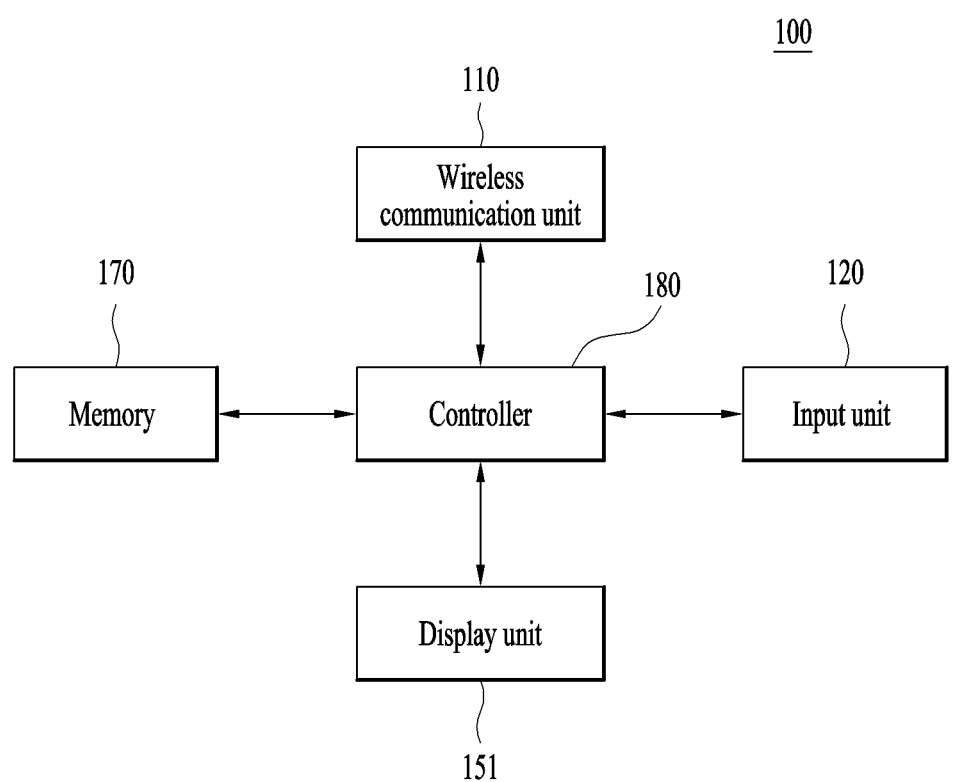
FIG. 2 is a block diagram illustrating a mobile device according to an embodiment of the present disclosure.

FIG. 2 is a block diagram illustrating a mobile device according to an embodiment of the present disclosure.

Referring to FIG. 2, a mobile device 100 includes a wireless communication unit 110, an input unit 120, a display unit 151, a memory 170, and a controller 180.

The wireless communication unit 110 transmits and receives data with an external device. The external device includes a server.

The input unit 120 receives a touch or voice input from a user.

The display unit 151 displays a first texture according to a control command from the controller 180.

The memory 170 stores a specific application.

When the controller 180 executes the specific application, the controller 180 receives the first texture from the memory 170. Then, the controller 180 classifies the received first texture as static or dynamic based on texture attributes. When the first texture is a static texture, the controller 180 classifies the first texture as compressed or uncompressed depending on whether compression is applied. When the first texture is a static and compressed texture, the controller 180 classifies the first texture as mipmapped or non-mipmapped depending on whether mipmap is applied. When the first texture is a static and uncompressed texture, the controller 180 classifies the first texture as mipmapped or non-mipmapped depending on whether the mipmap is applied. When the first texture is a dynamic texture, the controller 180 classifies the first texture as a shadow or non-shadow map based on the aspect ratio of a screen. Then, the controller 180 adjust the size of the first texture based on the attributes of the classified texture.

Figure 3:
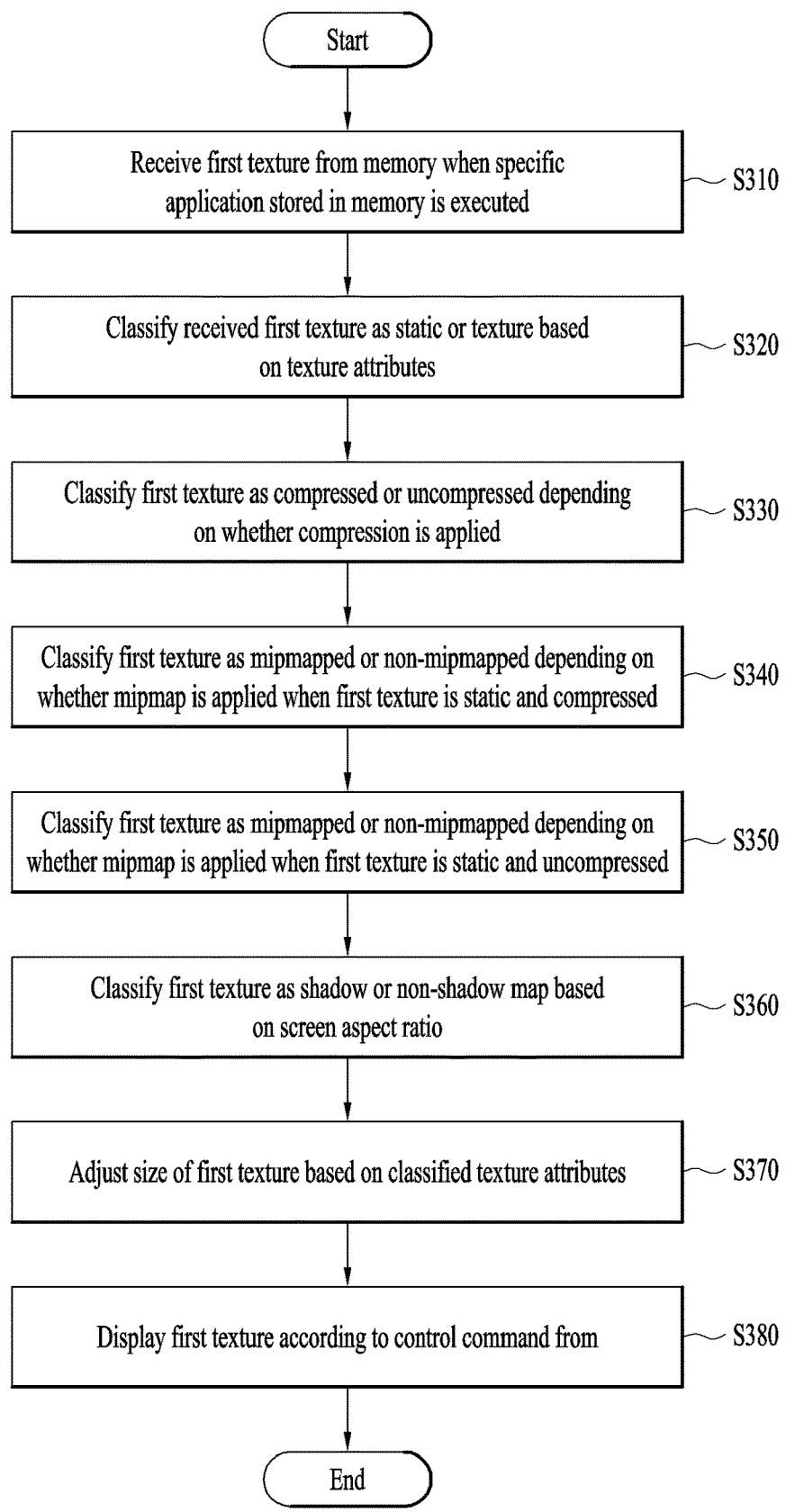
FIG. 3 is a flowchart illustrating a method of controlling the mobile device according to an embodiment of the present disclosure.

FIG. 3 is a flowchart illustrating a method of controlling the mobile device according to an embodiment of the present disclosure. The control method may be performed by the controller 180.

Referring to FIG. 3, when the controller 180 executes the specific application stored in the memory 170, the controller 180 receives the first texture from the memory 170 (S310).

The controller 180 classifies the received first texture as static or texture based on texture attributes (S320).

When the first texture is a static texture, the controller 180 classifies the first texture as compressed or uncompressed depending on whether compression is applied (S330).

When the first texture is a static and compressed texture, the controller 180 classifies the first texture as mipmapped or non-mipmapped depending on whether mipmap is applied (S340).

When the first texture is a static and uncompressed texture, the controller 180 classifies the first texture as mipmapped or non-mipmapped depending on whether the mipmap is applied (S350).

When the first texture is a dynamic texture, the controller 180 classifies the first texture as a shadow or non-shadow map based on the aspect ratio of a screen (S360).

The controller 180 adjust the size of the first texture based on the attributes of the classified texture (S370).

The display unit 151 displays the first texture according to a control command from the controller 180 (S380).

Figure 4:
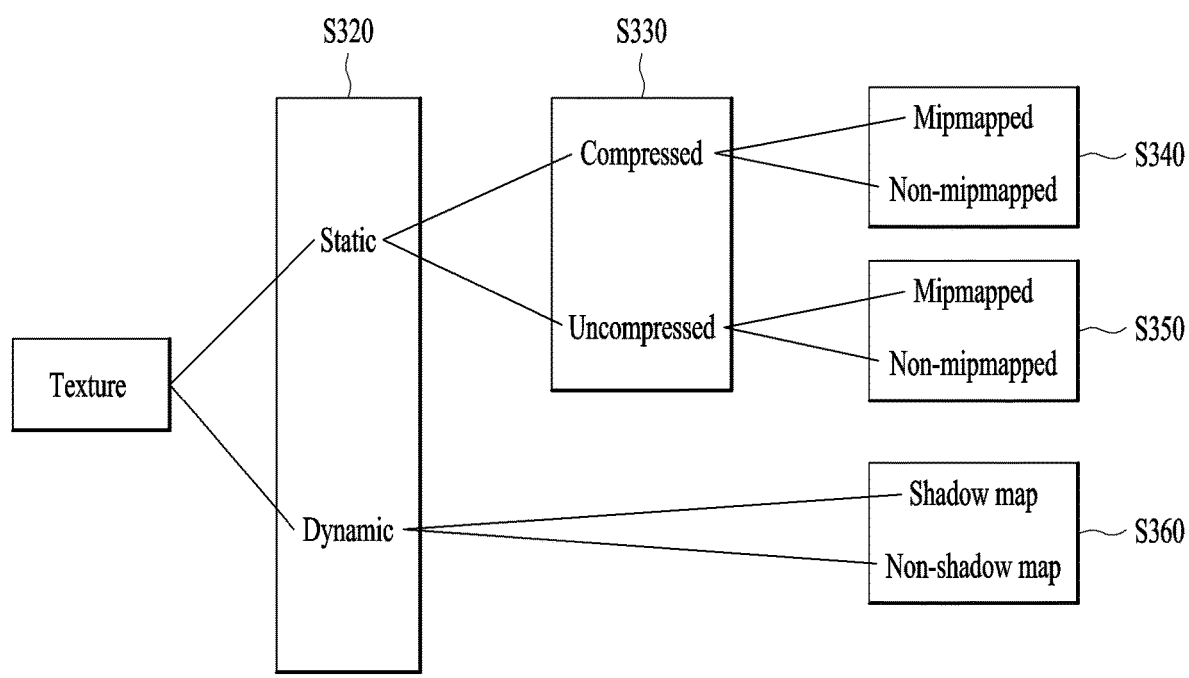
FIG. 4 is a diagram illustrating text classification based on text attributes according to an embodiment of the present disclosure.

FIG. 4 is a diagram illustrating text classification based on text attributes according to an embodiment of the present disclosure.

Referring to FIG. 4, the controller 180 classifies the received first texture as static or dynamic based on texture attributes (S320).

The criteria for classification between static and dynamic textures will be described. First, if the first texture is predetermined and installed in the specific application, the controller 180 classifies the first texture as a static texture. That is, the static texture refers to a texture generated by a developer and installed in an application.

When the first texture is created in each frame, the controller 180 classifies the first texture as a dynamic texture. That is, the dynamic texture refers to a texture created in each frame by render-to-texture.

When the first texture is the static texture, the controller 180 classifies the first texture as compressed or uncompressed depending on whether compression is applied (S330). The criteria for classification between compressed and uncompressed textures will be described.

The compressed texture refers to a texture compressed by ETC, ASTC, PVRTC, etc. The uncompressed texture refers to a texture where no compression is applied.

When the first texture is a static and compressed texture, the controller 180 classifies the first texture as mipmapped or non-mipmapped depending on whether mipmap is applied (S340). The criteria for classification between mipmapped and non-mipmapped textures will be described.

The mipmapped texture refers to a texture where the mipmap is applied. The non-mipmapped texture refers to a texture where no mipmap is applied.

When the first texture is a static and uncompressed texture, the controller 180 classifies the first texture as mipmapped or non-mipmapped depending on whether the mipmap is applied (S350). The criteria for classification between mipmapped and non-mipmapped textures will be described.

The mipmapped texture refers to a texture where the mipmap is applied. The non-mipmapped texture refers to a texture where no mipmap is applied.

When the first texture is a dynamic texture, the controller 180 classifies the first texture as a shadow or non-shadow map based on the aspect ratio of a screen (S360). The criteria for classification between shadow and non-shadow maps will be described.

When the screen aspect ratio is one to one, the controller 180 determines the first texture as the shadow map. When the screen aspect ratio is not one-to-one, the controller 180 determines the first texture as the non-shadow map.

Shadow mapping means representing the shadow of an object based on three-dimensional computer graphics. For example, in the shadow mapping, the controller 180 places a camera at the location of a light source and draws the depth of an object while looking down at the object. The shadow map refers to a texture including the depth.

FIG. 5 is a diagram illustrating a texture classification method based on OpenGL command syntax according to an embodiment of the present disclosure.

Referring to FIG. 5, texture classification may be performed by the OpenGL command syntax and processed by the command dispatcher of a graphic processing unit (GPU) driver. Here, OpenGL refers to API used for three-dimensional graphics.

For example, when the controller classifies the first texture as static or dynamic, the controller 180 determines the first texture as dynamic if texture data is null.

Figure 6:
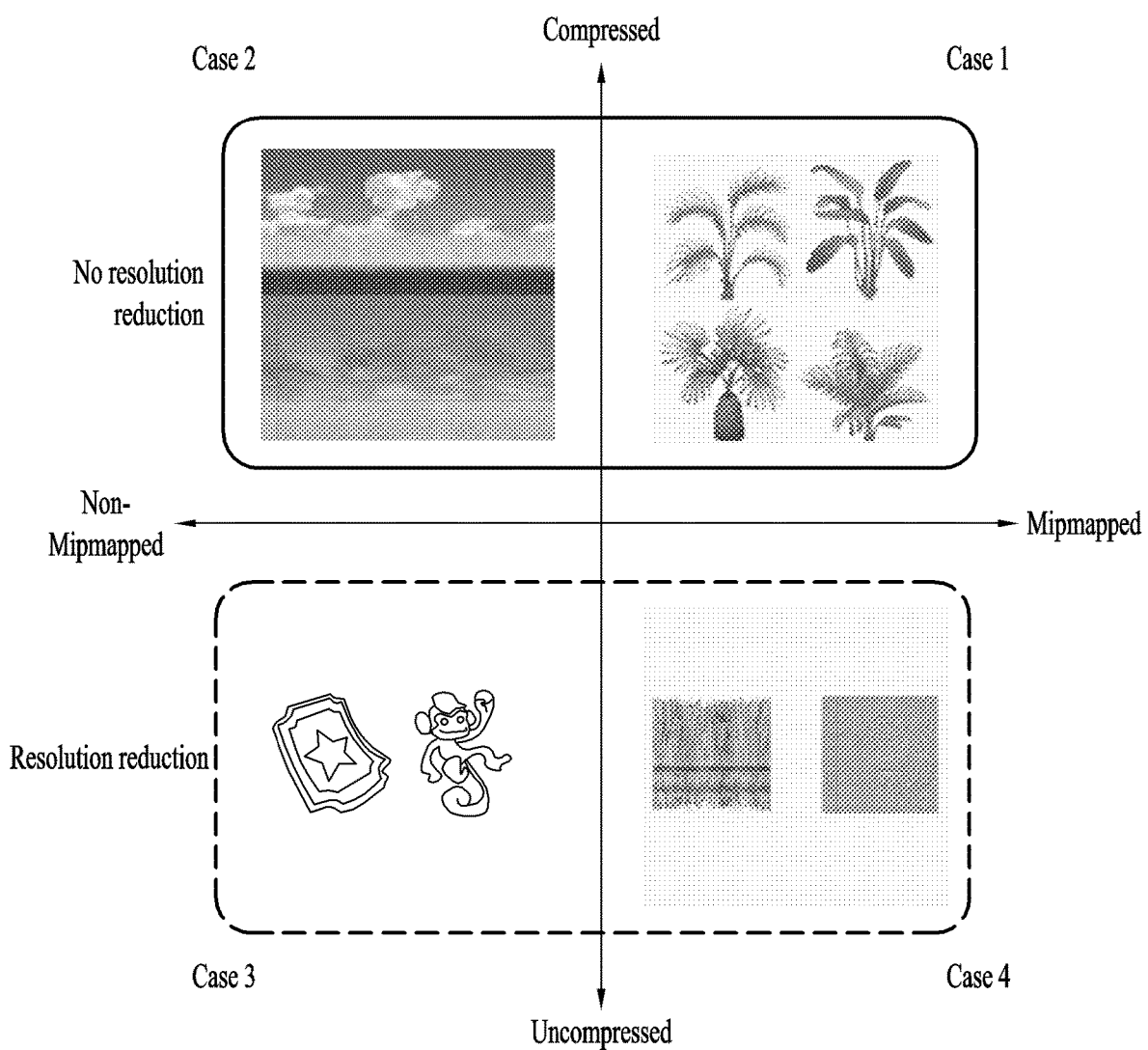
FIG. 6 is a diagram illustrating a method of adjusting the size of a static texture in the prior art.

FIG. 6 is a diagram illustrating a method of adjusting the size of a static texture in the prior art.

Referring to FIG. 6, case 1, case 2, case 3, and case 4 exist.

Case 1 means that the first texture is static, compressed, and mipmapped. Most cases of texture application are Case 1. In Case 1, the controller 180 may reduce the size of the first texture.

Case 2 means that the first texture is static, compressed, and non-mipmapped. In the prior art, the controller 180 may not reduce the resolution of the texture.

Case 3 means that the first texture is static, uncompressed, and non-mipmapped. In the prior art, the controller 180 reduces the resolution of the first texture. As a result, blurring and image quality degradation may occur in the texture.

Case 4 means that the first texture is static, uncompressed, and mipmapped. In the prior art, since the controller 180 does not adjust the mipmap level of the first texture, the file size of the first texture increases. As a result, the first texture may occupy a large amount of memory capacity and increase power consumption.

Figure 7:
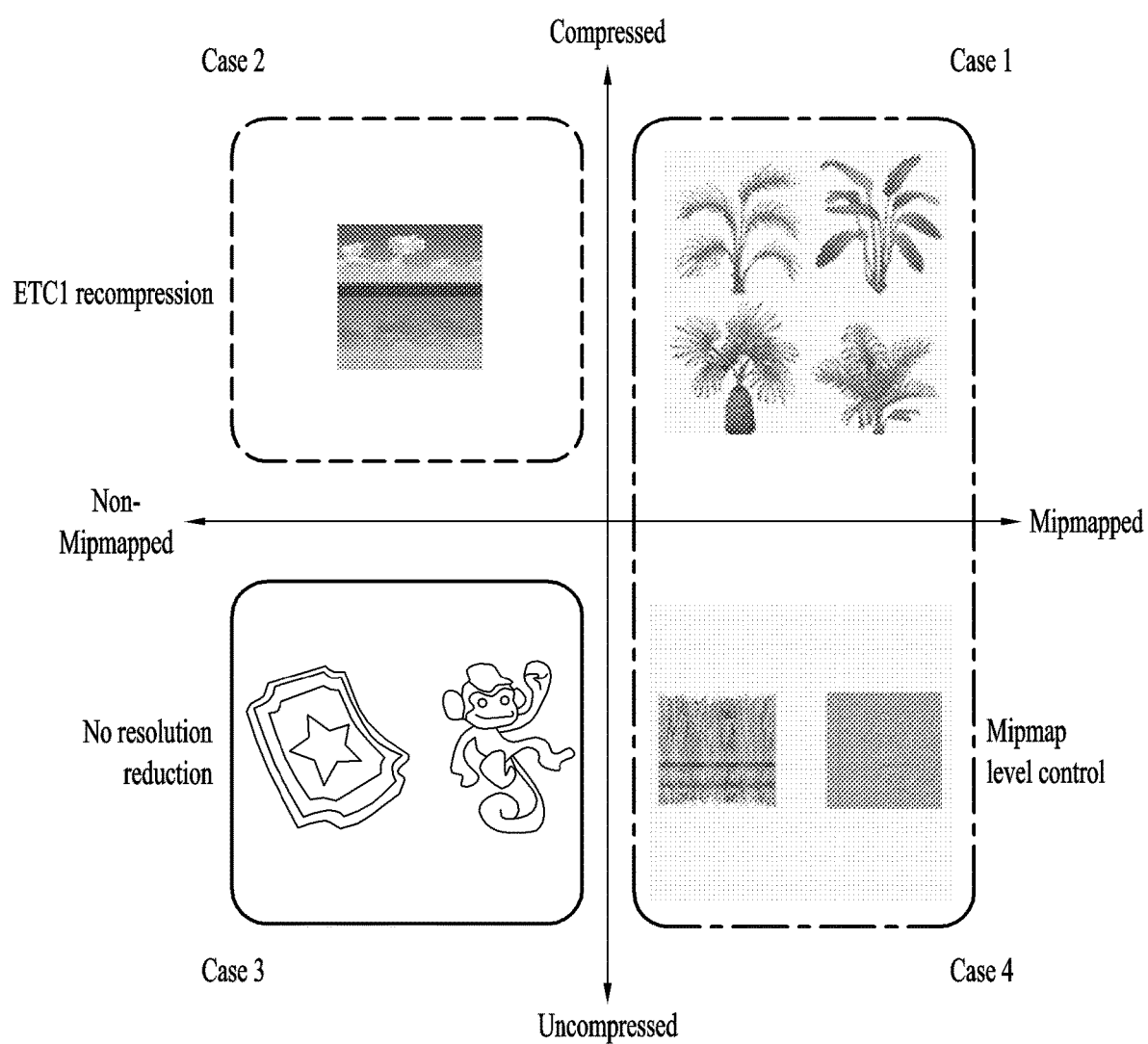
FIG. 7 is a diagram illustrating a method of adjusting the size of a static texture according to the present disclosure.

FIG. 7 is a diagram illustrating a method of adjusting the size of a static texture according to the present disclosure.

Case 1 means that the first texture is static, compressed, and mipmapped. Most cases of texture application are Case 1. In Case 1, the controller 180 may reduce the size of the first texture.

Case 2 means that the first texture is static, compressed, and non-mipmapped.

When the first texture is static, compressed, and non-mipmapped, the controller 180 may determine the attributes of the first texture as a background image. The background image may include sky, surroundings, buildings, mountains, space, etc.

The controller 180 compresses the first texture with ETC1. Details thereof will be described later with reference to FIG. 8.

Case 3 means that the first texture is static, uncompressed, and non-mipmapped. In the prior art, the controller 180 reduces the resolution of the first texture. As a result, blurring and image quality degradation may occur in the texture. According to the present disclosure, the controller 180 maintains the resolution of the first texture instead of adjusting the size of the first texture. Details thereof will be described later with reference to FIG. 10.

Case 4 means that the first texture is static, uncompressed, and mipmapped.

When the first texture is static, uncompressed, and mipmapped, the controller 180 determines the attributes of the first texture as an image with a level of detail greater than a reference value. The first texture includes a rice straw image, a human face image, a flame image, a leave image, a detailed embossed image, a detailed debossed image, etc.

An image with a level of detail greater than the reference value refers to an image having a reducible size but a non-decreasing resolution due to no compression. That is, the image may be an important image. On the other hand, an image with a level of detail smaller than the reference value refers to an image having a decreasing size and a decreasing resolution due to the application of compression. That is, the image may be an unimportant image.

In the prior art, since the controller 180 does not adjust the mipmap level of the first texture, the file size of the first texture increases. As a result, the first texture may occupy a large amount of memory capacity and increase power consumption. However, according to the present disclosure, since the controller 180 adjusts the mipmap level of the first texture, the file size of the first texture may decrease, thereby reducing the memory capacity and the power consumption. Details thereof will be described later with reference to FIG. 9.

Figure 8:
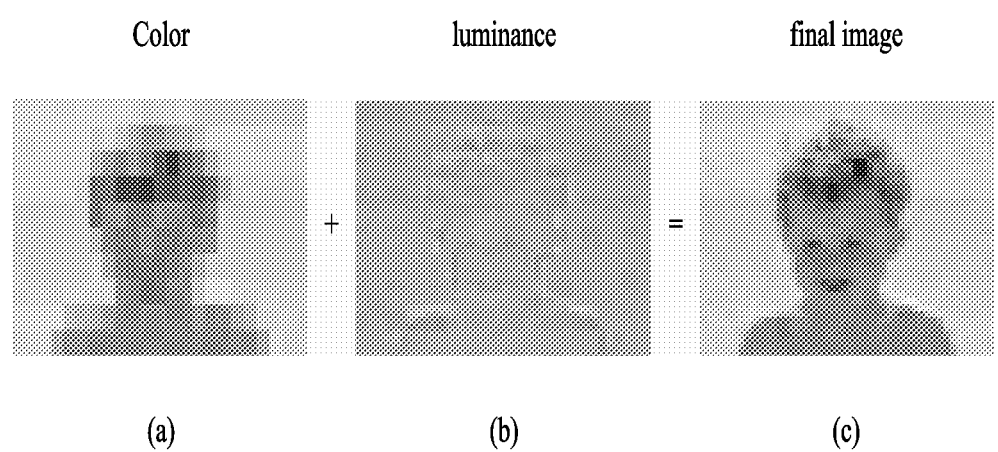
FIG. 8 is a diagram illustrating the adjustment of the size of a first texture when the first texture is static, compressed, and non-mipmapped according to an embodiment of the present disclosure.

FIG. 8 is a diagram illustrating the adjustment of the size of the first texture when the first texture is static, compressed, and non-mipmapped according to an embodiment of the present disclosure.

ETC1 compression will be described in brief with reference to FIG. 8. Referring to FIG. 8 (a), the color of a texture image is compressed. Referring to FIG. 8 (b), the brightness of the light of the texture image is compressed. Referring to FIG. 8 (c), a final image is generated.

ETC is the acronym of Ericsson Texture Compression and refers to a texture format made by Ericsson. ETC is an android standard compression format.

When the first texture is compressed and non-mipmapped, it corresponds to Case 2 of FIG. 7. In Case 2, the first texture needs to be recompressed to reduce the resolution of the first texture. Thus, the time required for loading and recompressing the texture increases.

When the time required for decompressing a texture is greater than the time required for compressing the texture, it may be problematic. That is, a method for reducing the time required for decompression is required. ETC2 has a compression time greater than that of ETC1. Thus, if only ETC2 RGB888 content of the texture is recompressed with ETC1, the decompression time decreases.

When the first texture is compressed and non-mipmapped, the controller 180 compresses only a part of the first texture related to ETC2 RGB888 content with ETC1.

An open source, etcpak 0.5d is used for the ETC1 compression algorithm according to an embodiment of the present disclosure (https://bitbucket.org/wolfpld/etcpak/wiki/Home). The algorithm is the fastest ETC1 compression algorithm.

The controller 180 implements the algorithm by porting etcpak 0.5 (Tandul 2016) code on the MALi driver. In this case, a single thread is used, but single instruction multiple data (SIMD) is not used.

When two processes are performed by a single thread, one process is completed, and then the other process starts. However, when multiple threads are used, the processes are performed alternately by two threads for a short time so that a user may feel as if the two processes are performed at the same time. However, the time required for the single thread may be greater than that for the two threads due to context switching between threads.

When only a central processing unit (CPU) is simply used as in the text compression according to the present disclosure, it is more efficient to perform programming with a single thread than multiple threads.

According to an embodiment of the present disclosure, the control 180 may automatically determine whether the first texture is mipmapped by applying a dispatch queue.

In the prior art, since even a mipmapped texture is recompressed with ETC1 by one command, the loading time thereof increases. However, according to the present disclosure, since the dispatch queue using a plurality of commands is applied, the loading time may decrease.

According to the present disclosure, the controller 180 may perform recompression regardless of the compression format of the first texture.

In the prior art, since a specific format of recompression is applied to the first texture, the power consumption increases. However, according to the present disclosure, since recompression is performed regardless of the compression format of the first texture, the power consumption may decrease.

Figure 9:
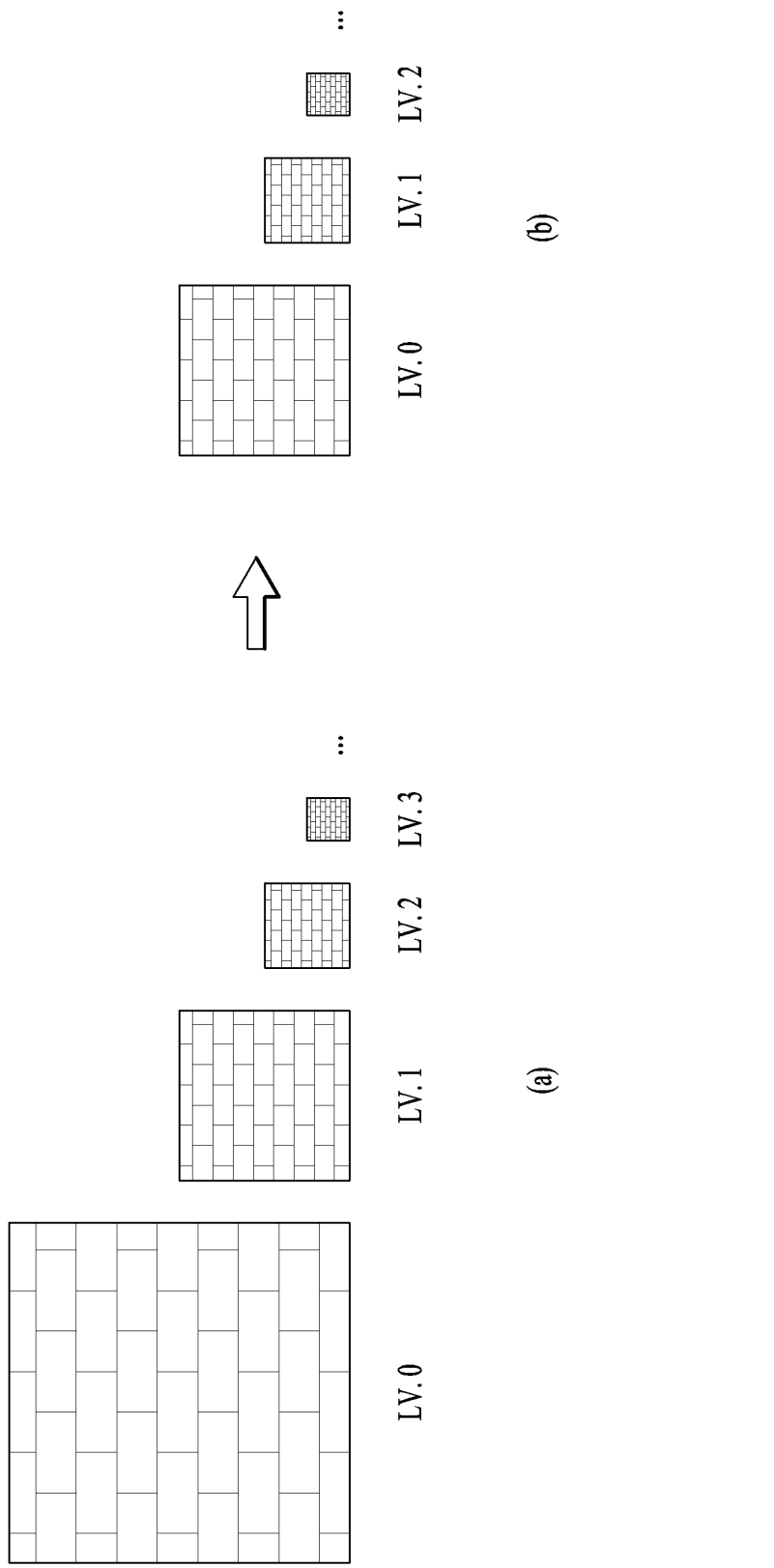
FIG. 9 is a diagram illustrating the adjustment of the mipmap level of the first texture when the first texture is static and mipmapped according to an embodiment of the present disclosure.

FIG. 9 is a diagram illustrating the adjustment of the mipmap level of the first texture when the first texture is static and mipmapped according to an embodiment of the present disclosure.

FIG. 9 shows a state before the adjustment of the mipmap level and a state after the adjustment of the mipmap level.

Specifically, FIG. 9 (a) shows the state before the adjustment of the mipmap level, and FIG. 9 (b) shows the state after the adjustment of the mipmap level.

According to an embodiment of the present disclosure, when a mipmapped texture is loaded, the maximum texture size is reduced to ¼ by decreasing one level at a time. When the first texture is mipmapped, the controller 180 discards a texture corresponding to level 0 and decreases one level at a time from a texture corresponding to level 1.

Referring to FIG. 9 (a), when the mipmapped texture is configured as follows: 256×256 level 0, 128×128 level 1, and 64×64 level 2, the controller 180 decreases one level from a 128×128 level 1 texture and obtains 128×128 level 0.

Referring to FIG. 9 (b), the mipmapped texture is configured as follows: 256×256 level 0, 128×128 level 1, and 64×64 level 2.

In the prior art, since the level 0 texture is recompressed and discarded, the loading time unnecessarily increases. According to the OpenGL specification, since the call order between glTexparamerteri( ) and glTexImage2D( ) is variable, it is difficult to determine whether the texture is mipmapped when the level 0 texture is loaded.

According to the present disclosure, since the level 0 texture is discarded and the level decreases one by one from level 1, that is, the level 0 texture having the largest amount of computation is eliminated in advance, the amount of computation and the loading time may be reduced regardless of the application and format of compression.

FIG. 10 is a diagram illustrating the adjustment of the size of the first texture when the first texture is static, uncompressed, and non-mipmapped according to an embodiment of the present disclosure.

Specifically, FIG. 10 (a) shows menus, and FIG. 10 (b) shows icons.

When the first texture is uncompressed and non-mipmapped, the controller 180 may determine the attributes of the first texture as at least one of an icon, a menu, and a screen size image. The screen size image includes the ending scene of a game application.

When the first texture is uncompressed and non-mipmapped, the first texture is highly likely to be a texture mapped one-to-one to the screen. In this case, the first texture may be at least one of the menu, icon, and screen size image, which are directly mapped to the screen. When the menu, icon, and screen size image are compressed, letters may become blurred and the image quality may be degraded. To avoid such a problem, no compression is applied.

Accordingly, when the first texture is uncompressed and non-mipmapped, i.e., in Case 3 of FIG. 7, the controller 180 maintains the size of the first texture. That is, the controller 180 does not adjust the size of the first texture. On the other hand, in Case 3 of FIG. 6, i.e., in the prior art, since the resolution of the first texture decreases, the first texture becomes blurred and the image quality is degraded.

FIG. 11 is a diagram illustrating the adjustment of the size of the first texture in the prior art when the first texture is dynamic.

In the prior art, when the first texture is dynamic, the first texture is not classified as a shadow or non-shadow map, and the size and resolution of the first texture are not reduced. In this case, since the texture has a large size, the texture occupies a large amount of memory and increases the loading time thereof.

FIG. 12 is diagram illustrating the adjustment of the size of the first texture according to the present disclosure when the first texture is dynamic.

Specifically, FIG. 12 (*a*) shows a non-shadow map, and FIG. 12 (*b*) shows a shadow map. The criteria for classification between shadow and non-shadow maps will be described.

When the first texture is dynamic and the screen aspect ratio is one to one, the control 180 classifies the first texture as the shadow map. When the first texture is dynamic and the screen aspect ratio is not one-to-one, the control 180 classifies the first texture as the non-shadow map.

Hereinafter, a description will be given of how the resolution of the first texture is reduced when the first texture is the shadow map.

When the first texture is the shadow map, the controller 180 reduces the resolution of the first texture. When the first texture is the non-shadow map, the controller 180 maintains the resolution of the first texture. A case in which the first texture is the shadow map will be described with reference to FIG. 13.

When the screen aspect ratio is not one-to-one, if the resolutions of a main frame buffer and a G-buffer decrease, the overall resolution decreases. Thus, the resolutions of the main frame buffer and G-buffer are not reduced. In addition, it is difficult to distinguish between reflection and velocity maps based on only the screen aspect ratio, the resolutions of the reflection and velocity maps are not reduced.

Figure 13:
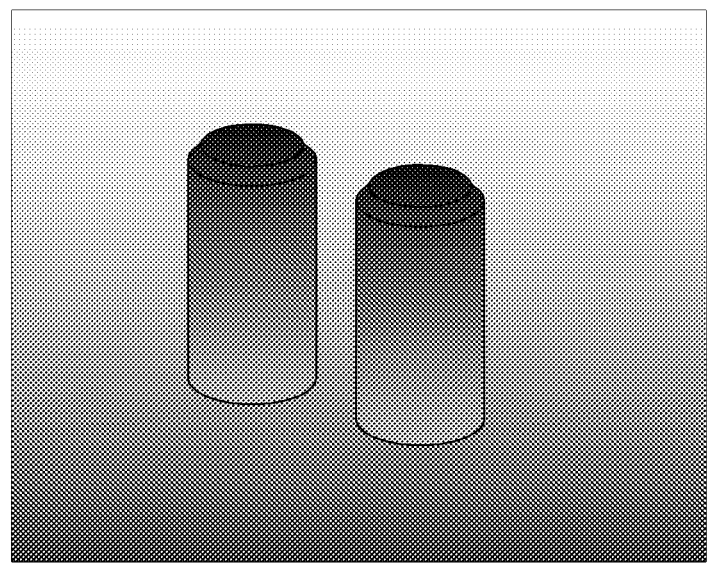
FIG. 13 is a diagram illustrating the adjustment of the size of the first texture when the first texture is a shadow map according to an embodiment of the present disclosure.

FIG. 13 is a diagram illustrating the adjustment of the size of the first texture when the first texture is a shadow map according to an embodiment of the present disclosure.

Referring to FIG. 13, when at least one of the following two conditions is satisfied, the controller 180 determines the first texture as the shadow map.

The first condition is as follows: when a texture image is defined according to glTexImage 2D, if a data pointer is NULL (render-to-texture), the controller 180 determine the first texture as the shadow map.

The second condition is as follows: when the horizontal to vertical ratio of the texture is one to one, the controller determined the first texture as the shadow map.

According to an embodiment of the present disclosure, the controller 180 determine the first texture as the shadow map by modifying a Mali driver when at least one of the two conditions is satisfied.

The Mali driver is modified as follows. First, depth data may be attached based on a render buffer object (RBO). Next, a texture type may be directly designated as a depth image without using the RBO.

According to an embodiment of the present disclosure, the controller 180 may not adjust the size of the first texture, that is, maintain the current size of the first texture in the following cases.

When glTexstorage 2D is used, the controller 180 maintains the current size of the first texture. The reason for this is that it is difficult to distinguish between static and dynamic textures. The game temple rune 2 may be taken as an example.

When cascaded shadow mapping is implemented by a texture array of glTexImage3D, the controller 180 maintains the current size of the first texture. Adreno SDK may be taken as an example.

FIG. 14 is a diagram illustrating an original image and an image in which the size of a texture is adjusted according to the prior art.

Specifically, FIG. 14 (*a*) shows the original image, and FIG. 14 (*b*) shows the image according to the prior art.

The mobile device is Galaxy S7, and the texture is adjusted by about 25% using the game tuner application.

Referring to FIG. 14 (*b*), the controller 180 reduces the resolution of an icon image 1410, and as a result, the icon image 1410 becomes blurred. That is, the quality of the icon image 1410 is lower than that of the original image.

A sand beach image 1420 corresponds to Case 2 of FIG. 6. The controller 180 does not reduce the resolution of the sand beach image 1420. Thus, the sand beach image 1420 has the same quality as that of the original image.

A leaf image 1430 corresponds to Case 1 of FIG. 6. The controller 180 compresses the leaf image 1430, applies mipmap, and reduces the resolution of the leaf image 1430. As a result, the quality of the leaf image 1430 is lower than that of the original image.

Hereinafter, a description will be given of how a game tuner adjusts the quality of a texture.

First, each texture is rendered on an off-screen frame buffer. A CPU memory reads the results of rendering through the glReadPixels( ) function. The size of the texture is reduced on the CPU code. For example, when the setting value is 25%, the height and length are set to 50%. The reduced texture is uploaded to a GPU memory again.

In the prior art, the object thereof is to improve a frame per second (FPS) by decreasing the size of an uncompressed texture.

However, the prior art has the following disadvantages. First, the quality of an image is degraded. Most uncompressed textures are one-to-one mapped to a screen rather than to an object. If the size of such a texture is forcefully adjusted, the texture may become blurred.

Next, the application range may become problematic. In the prior art, it may not be applied to a compressed texture and a dynamic texture. Further, the loading time may increase due to the following processing order: GPU→CPU→GPU.

FIG. 15 is a diagram illustrating an image in which the size of a texture is adjusted according the present disclosure.

Specifically, FIG. 15 (a) shows an original image, and FIG. 15 (b) shows the image according to the present disclosure.

Referring to FIG. 15 (b), an icon 1510 is uncompressed and non-mipmapped. That is, the icon 1510 corresponds to Case 3 of FIG. 7. The controller 180 does not reduce the resolution of the icon 1510. Thus, the icon 1510 may not become blurred.

A sand beach image 1520 corresponds to Case 2 of FIG. 7. In Case 2, that is, when the first texture is static, uncompressed, and non-mipmapped texture, the controller 180 determines the attributes of the first texture as a background image. After determining the attributes of the sand beach image 1520 as the background image, the controller 180 recompresses the sand beach image 1520 with ETC1. Thus, it may be seen that the quality of the sand beach image 1520 is slightly degraded compared to that of the original image.

A leaf image 1540 corresponds to Case 1 of FIG. 7. In Case 1, that is, when the first texture is static, compressed, and mipmapped, the controller 180 determines the attributes of the first texture as a normal image. The controller 180 compresses the leaf image 1530, applies mipmap, and decreases the resolution of the leaf image 1530. The quality of the leaf image 1530 is lower than that of the original image.

According to the present disclosure, the controller 180 may classify a texture based on the attributes of the texture, adjust the size of the texture in a different way depending on the category of the classified texture, and enable implementation at GPU driver levels. Thus, the memory capacity and power consumption may decrease compared to the prior art.

FIG. 16 is a table showing comparison between power consumption in the prior art and power consumption according to the present disclosure.

Referring to FIG. 16, the following games: Beach Buggy racing, Implosion, and Xenowerk are used.

In the game Beach Buggy Racing, a GPU requires a power of 289 mW according to the prior art and requires a power of 237 mW according to the present disclosure. That is, the power consumption is reduced by about 17.9%. A DDR requires a power of 1112 mW according to the prior art and requires a power of 237 mW according to the present disclosure. That is, the power consumption is reduced by about 8.1%.

In the game Implosion, the GPU requires a power of 467 mW according to the prior art and requires a power of 447 mW according to the present disclosure. That is, the power consumption is reduced by about 4.2%. The DDR requires a power of 1460 mW according to the prior art and requires a power of 1399 mW according to the present disclosure. That is, the power consumption is reduced by about 4.1%.

In the game Xenowerk, the GPU requires a power of 697 mW according to the prior art and requires a power of 569 mW according to the present disclosure. That is, the power consumption is reduced by about 18.3%. The DDR requires a power of 969 mW according to the prior art and requires a power of 825 mW according to the present disclosure. That is, the power consumption is reduced by about 14.8%.

The experiments of the present disclosure are set up as follows. The above three games: Beach Buggy Racing, Implosion, and Xenowerk have various graphic effects.

The following hardware is used. GH 16 PDK16B1.0 #5 is used as the board. In addition, A72+A53 octacore CPU, Mali T880MP6 GPU, and LPDDR4 1,600 are used. Further, NI USB-6363 is used as power measuring equipment.

The following software is used. The maximum clock, i.e., performance governor is used as the CPU clock. For the three games, the GPU clock is fixed to 384, 672, and 480 MHz, on which the games are capable of operating without any loss. The default DFS of the memory is a maximum of 1,600 MHz. The reason for this is to minimize the effect of the CPU/GPU governor and measure the effect of DDR DFS. As the OS, Android 7.0 is used. The GPU driver is Mali Midgard r12p0.

According to an embodiment of the present disclosure, a texture is classified as dynamic or static. When the texture is static, the texture is classified as compressed or uncompressed. The texture is further classified as mipmapped or non-mipmapped. When the texture is dynamic, the texture is classified as a shadow or non-shadow map. Since the size of the texture is adjusted based on the attributes of the classified texture, the size of the texture may be properly adjusted depending on the attributes of the texture, thereby avoiding image quality degradation and improving power efficiency.

According to another embodiment of the present disclosure, when a texture is static, compressed, and non-mipmapped, the size of the texture is adjusted by determining the attributes of the texture as a background image. Thus, the size of the texture may be properly adjusted depending on the attributes of the texture, thereby avoiding image quality degradation and decreasing loading time.

According to a further embodiment of the present disclosure, when a texture is dynamic and when the screen aspect ratio of the texture is one to one, the size of the texture is adjusted by determining the attributes of the texture as a shadow map. Thus, the overall resolution may decrease when reduction is performed in a specific case, thereby avoiding image quality degradation and decreasing loading time.

It should be understood that example embodiments described herein should be considered in a descriptive sense only and not for purposes of limitation. Descriptions of features or aspects within each device or method according to example embodiments should typically be considered as available for other similar features or aspects in other devices or methods according to example embodiments. While some example embodiments have been particularly shown and described, it will be understood by one of ordinary skill in the art that variations in form and detail may be made therein without departing from the spirit and scope of the claims.

Mode for Carrying Out the Present Disclosure

Various embodiments have been described above in the best mode for carrying out the present disclosure.

INDUSTRIAL APPLICABILITY

The present disclosure is applicable to a mobile device for adjusting the size of a series of textures.

It is apparent to those skilled in the art that various changes and modifications can be made in the present disclosure without departing from the spirit or scope of the disclosure. Therefore, it is intended that the present disclosure cover the modifications and variations of this disclosure provided they come within the scope of the appended claims and their equivalents.

The invention claimed is:

1. A mobile device, comprising:
a memory configured to store a specific application;
a controller configured to:
receive a first texture from the memory when the specific application is executed;
classify the received first texture as static or dynamic based on texture attributes;

when the first texture is static, classify the first texture as compressed or uncompressed depending on whether compression is applied;

when the first texture is static and compressed, classify the first texture as mipmapped or non-mipmapped depending on whether mipmap is applied;

when the first texture is static and uncompressed, classify the first texture as mipmapped or non-mipmapped depending on whether the mipmap is applied;

when the first texture is dynamic, classify the first texture as a shadow map or a non-shadow map based on a screen aspect ratio; and adjust a size of the first texture based on attributes of the classified texture; and a display configured to display the first texture according to a control command from the controller;

wherein the controller is configured to:

when the first texture is dynamic and when the screen aspect ratio is one to one, classify the first texture as the shadow map;

when the first texture is dynamic and when the screen aspect ratio is not one to one, classify the first texture as the non-shadow map;

when the first texture is the shadow map, reduce a resolution of the first texture; and when the first texture is the non-shadow map, maintain the resolution of the first texture.

2. The mobile device of claim 1, wherein the controller is configured to:

when the first texture is predetermined and installed in the specific application, classify the first texture as static; and when the first texture is created in each frame, classify the first texture as dynamic.

3. The mobile device of claim 1, wherein the controller is configured to compress only a part of the first texture related to ETC2 RGB888 content with ETC1 when the first texture is compressed and non-mipmapped.

4. The mobile device of claim 1, wherein the controller is configured to discard a texture corresponding to level 0 and decrease one level at a time from a texture corresponding to level 1 when the first texture is mipmapped.

5. The mobile device of claim 1, wherein the controller is configured to determine attributes of the first texture as at least one of an icon, a menu, or a screen size image when the first texture is uncompressed and non-mipmapped.

6. The mobile device of claim 1, wherein the controller is configured to maintain the size of the first texture when the first texture is uncompressed and non-mipmapped.

7. The mobile device of claim 1, wherein the controller is configured to determine attributes of the first texture as a background image when the first texture is compressed and non-mipmapped.

8. The mobile device of claim 1, wherein the controller is configured to determine attributes of the first texture as an image with a level of detail greater than a reference value when the first texture is compressed and mipmapped.

9. A method of controlling a mobile device, the method comprising:

receiving a first texture from a memory when a specific application stored in the memory is executed;

classifying the received first texture as static or dynamic based on texture attributes;

when the first texture is static, classifying the first texture as compressed or uncompressed depending on whether compression is applied;

when the first texture is static and compressed, classifying the first texture as mipmapped or non-mipmapped depending on whether mipmap is applied;

when the first texture is static and uncompressed, classifying the first texture as mipmapped or non-mipmapped depending on whether the mipmap is applied;

when the first texture is dynamic, classifying the first texture as a shadow map or a non-shadow map based on a screen aspect ratio;

adjusting a size of the first texture based on attributes of the classified texture;

displaying the first texture according to a control command from a controller;

when the first texture is dynamic and when the screen aspect ratio is one to one, classifying the first texture as the shadow map;

when the first texture is dynamic and when the screen aspect ratio is not one to one, classifying the first texture as the non-shadow map;

when the first texture is the shadow map, reducing a resolution of the first texture; and when the first texture is the non-shadow map, maintaining the resolution of the first texture.

10. The method of claim 9, further comprising:

when the first texture is predetermined and installed in the specific application, classifying the first texture as static; and when the first texture is created in each frame, classifying the first texture as dynamic.

11. The method of claim 9, further comprising, when the first texture is compressed and non-mipmapped, compressing only a part of the first texture related to ETC2 RGB888 content with ETC1.

12. The method of claim 9, further comprising, when the first texture is mipmapped, discarding a texture corresponding to level 0 and decreasing one level at a time from a texture corresponding to level 1.

13. The method of claim 9, further comprising, when the first texture is uncompressed and non-mipmapped, determining attributes of the first texture as at least one of an icon, a menu, or a screen size image.

14. The method of claim 9, further comprising, when the first texture is uncompressed and non-mipmapped, maintaining the size of the first texture.

15. The method of claim 9, further comprising, when the first texture is compressed and non-mipmapped, determining attributes of the first texture as a background image.

16. The method of claim 9, further comprising, when the first texture is compressed and mipmapped, determining attributes of the first texture as an image with a level of detail greater than a reference value.

* * * * *